United States Patent
Nelson

(10) Patent No.: US 7,739,493 B2
(45) Date of Patent: Jun. 15, 2010

(54) SYSTEMS AND METHODS FOR FACILITATING SECURE REMOTE ACCESS TO SENSITIVE DATA FROM AN EMBEDDED DEVICE

(75) Inventor: Michael D. Nelson, Park City, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 1008 days.

(21) Appl. No.: 10/431,905

(22) Filed: May 8, 2003

(65) Prior Publication Data

US 2004/0225879 A1    Nov. 11, 2004

(51) Int. Cl.
    H04L 29/06    (2006.01)
(52) U.S. Cl. ...................................... 713/153
(58) Field of Classification Search ................ 713/153, 713/160, 167, 166; 380/247; 726/2, 22
    See application file for complete search history.

(56) References Cited

U.S. PATENT DOCUMENTS

| | | | |
|---|---|---|---|
| 5,544,036 A | 8/1996 | Brown, Jr. et al. | |
| 5,608,655 A | 3/1997 | Moughanni et al. | |
| 5,640,153 A | 6/1997 | Hildebrand et al. | |
| 5,787,288 A | 7/1998 | Nagata et al. | |
| 5,822,692 A | 10/1998 | Krishan et al. | |
| 5,854,984 A | 12/1998 | Buhrmann et al. | |
| 5,883,886 A | 3/1999 | Eaton et al. | |
| 5,896,512 A | 4/1999 | Einbinder et al. | |
| 5,937,198 A | 8/1999 | Nelson et al. | |
| 5,960,080 A * | 9/1999 | Fahlman et al. | 380/252 |
| 5,983,074 A | 11/1999 | Jansen | |
| 6,028,506 A | 2/2000 | Xiao | |
| 6,058,104 A | 5/2000 | Snelling et al. | |
| 6,065,880 A | 5/2000 | Thompson | |
| 6,092,121 A * | 7/2000 | Bennett et al. | 709/250 |
| 6,131,040 A | 10/2000 | Knuutila et al. | |
| 6,363,423 B1 | 3/2002 | Chiles et al. | |
| 6,477,578 B1 * | 11/2002 | Mhoon | 709/229 |
| 6,853,988 B1 * | 2/2005 | Dickinson et al. | 705/75 |
| 7,103,915 B2 * | 9/2006 | Redlich et al. | 726/27 |
| 7,130,424 B2 * | 10/2006 | Marshall | 380/33 |
| 2002/0077801 A1 * | 6/2002 | Morehead et al. | 703/24 |
| 2002/0112167 A1 * | 8/2002 | Boneh et al. | 713/182 |
| 2002/0180581 A1 * | 12/2002 | Kamiwada et al. | 340/5.2 |
| 2004/0049687 A1 * | 3/2004 | Orsini et al. | 713/189 |
| 2004/0210754 A1 * | 10/2004 | Barron et al. | 713/153 |
| 2004/0250067 A1 * | 12/2004 | Felix | 713/168 |

* cited by examiner

*Primary Examiner*—Michael Pyzocha
*Assistant Examiner*—Ali S Abyaneh
(74) *Attorney, Agent, or Firm*—Austin Rapp & Hardman

(57) ABSTRACT

A system for facilitating secure remote access to sensitive data is provided. The system includes a plurality of electronic devices. These electronic devices are under the control of an organization. The system also includes a data router. When the data router obtains sensitive data that is to be made available to remote clients, the data router secures the sensitive data and transmits the secured sensitive data over a first communication channel to an organization-controlled server. When the data router obtains other data that is to be made available to remote clients, the data router transmits the other data over the second communication channel to a third-party server.

1 Claim, 5 Drawing Sheets

SYSTEMS AND METHODS FOR FACILITATING SECURE REMOTE ACCESS TO SENSITIVE DATA FROM AN EMBEDDED DEVICE

TECHNICAL FIELD

The present invention relates generally to data security. More specifically, the present invention relates to systems and methods for facilitating secure remote access to sensitive data from an embedded device.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computers typically have one or more processors. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many electronic devices include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and tells the processors what to do to carry out certain tasks. For example, the computer software running on a thermostat may cause an air conditioner to stop running when a particular temperature is reached or may cause a heater to turn on when needed.

Sometimes, an organization wants to make data about its electronic devices available to certain remote clients, i.e., clients who are not in the same physical location as the electronic devices. This data may relate to the operation of the electronic devices themselves. For example, the data may indicate whether an electronic device is turned on, whether it is calibrated correctly, whether a cycle of operation has completed correctly, and so forth. Alternatively, or in addition, this data may relate to something other than the operation of the electronic devices. For example, the data may include a user identifier that corresponds to a user of an electronic device, a measurement taken by an electronic device, an alert generated by an electronic device, and so forth.

An organization typically uses a third-party service to make data available to remote clients. The third-party service is under the control of a third party, i.e., an entity other than the organization. The third-party service fulfills requests for data from authorized remote clients. Some of the data that an organization wants to make available to remote clients may be sensitive, i.e., not intended for public disclosure. Often, the organization may not trust the third party with sensitive data. Thus, benefits may be realized if means were provided to enable an organization to make sensitive data available to remote clients without disclosing the sensitive data to third parties.

DETAILED DESCRIPTION

Figure 1:
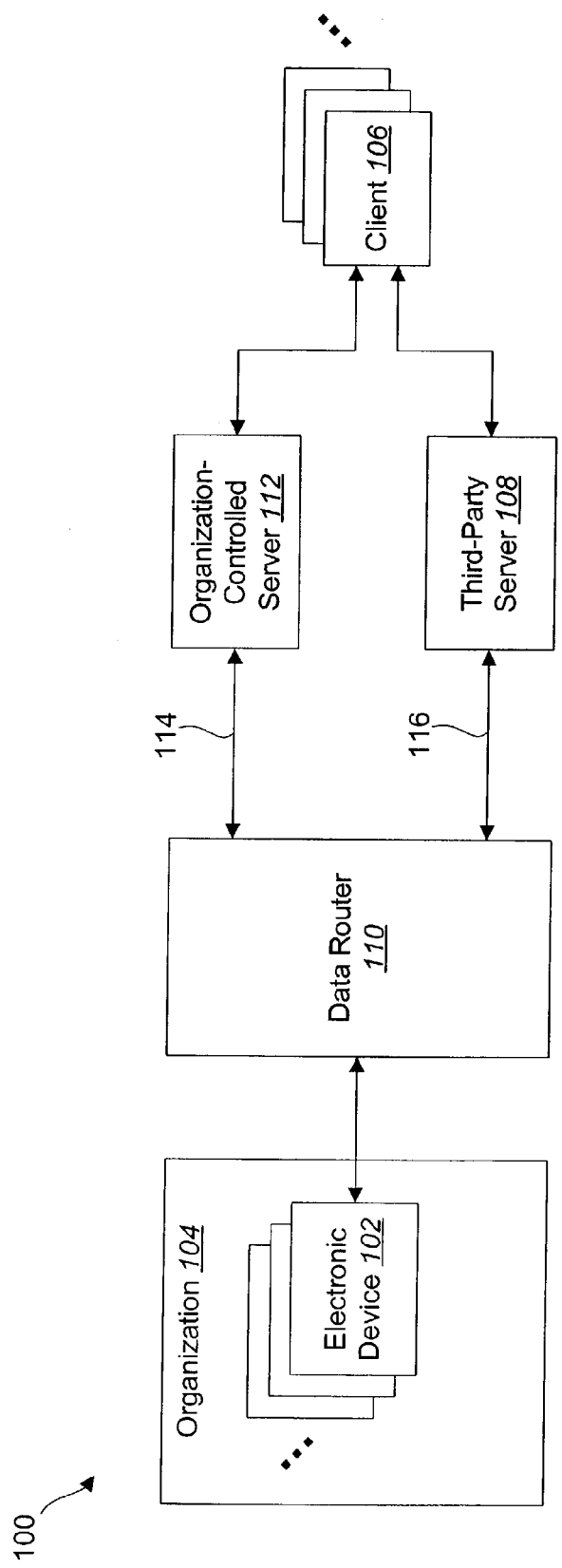
FIG. 1 is a block diagram illustrating an embodiment of a system for facilitating secure remote access to sensitive data.

A method for facilitating secure remote access to sensitive data from an embedded device is disclosed. In the method the sensitive data is obtained and then secured to create secured sensitive data. The secured sensitive data is transmitted over a first communication channel to a first destination. Other data is obtained that relates to operation of an electronic device and is transmitted over a second communication channel to a second destination.

The electronic device may be under the control of an organization. Further, the first destination may include an organization-controlled server that is under the control of the organization. The second destination may include a third-party server that is not under the control of the organization.

In certain embodiments, the secured sensitive data may pass through the third-party server en route to the organization-controlled server. In addition, the sensitive data may be translated into a format that is consistent with a communication protocol that governs electronic communication over the first communication channel. The other data may also be translated into a format that is consistent with a communication protocol that governs electronic communication over the second communication channel.

A data router for facilitating secure remote access to sensitive data from an embedded device is also disclosed. The data router includes a processor and memory in electronic communication with the processor. Program instructions are stored in the memory and are executable by the processor to implement a method for facilitating secure remote access to sensitive data from an embedded device.

A data router is disclosed that includes a data separation module that separates data into sensitive data and other data. The data router also includes a data securing module that secures the sensitive data to create secured sensitive data. The secured sensitive data is transmitted over a first communication channel to a first destination. The other data is transmitted over a second communication channel to a second destination.

The data router may include a protocol translation module that translates the sensitive data into a first format that is consistent with a first communication protocol that governs communication over the first communication channel. Moreover, the protocol translation module may translate the other data into a second format that is consistent with a second communication protocol that governs communication over the second communication channel.

A system for facilitating secure remote access to sensitive data is provided. The system includes a plurality of electronic devices. These electronic devices are under the control of an organization. The system also includes a data router. When the data router obtains sensitive data that is to be made available to remote clients, the data router secures the sensitive data and transmits the secured sensitive data over a first communication channel to an organization-controlled server. When the data router obtains other data that is to be made available to remote clients, the data router transmits the other data over the second communication channel to a third-party server.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

FIG. 1 is a block diagram illustrating an embodiment of a system 100 for facilitating secure remote access to sensitive data from an embedded device. The system 100 may include one or more embedded or electronic devices 102. These electronic devices 102 are under the control of an organization 104. Some examples of electronic devices 102 are vending machines, telephones, door locks, temperature sensors, motors, switches, lights, printers, fax machines, refrigerators, health monitors, elevators, escalators, copiers, scanners, manufacturing equipment, industrial equipment, computer equipment and peripherals, security systems, monitoring equipment, thermostats, and the like. Some examples of organizations 104 are corporations, small businesses, non-profit institutions, government bodies, and the like.

Sometimes, an organization 104 wants to make data available to certain remote clients 106, i.e., clients 106 who are not in the same physical location as the electronic devices 102. This data may relate to the operation of the electronic devices 102 themselves. For example, the data may indicate whether an electronic device 102 is turned on, whether it is calibrated correctly, whether a cycle of operation has completed correctly, and so forth. Alternatively, or in addition, this data may relate to something other than the operation of the electronic devices 102. For example, the data may include a user identifier that corresponds to a user of an electronic device 102, a measurement taken by an electronic device 102, an alert generated by an electronic device 102, and so forth.

An organization 104 typically uses a third-party service to make data available to remote clients 106. Third party service providers may include, but are not limited to, Internet Service Providers (ISPs), telecommunication providers, Application Service Providers (ASPs), etc. It will be understood by those skilled in the art that third party service providers may use many different kinds of equipment and systems to facilitate access by the remote clients 106. In the embodiment of FIG. 1 a third-party server 108 is shown as the means by which the third party service facilitates access by the remote clients 106. The third-party server 108 is under the control of a third party, i.e., an entity other than the organization 104. The third-party server 108 fulfills requests for data from authorized remote clients 106. Some of the data that an organization 104 wants to make available to remote clients 106 may be sensitive, i.e., not intended for public disclosure. Often, the organization 104 may not trust the third party with sensitive data. That is, for the example shown in FIG. 1, the organization 104 may not want to provide the sensitive data to the third-party server 108.

To enable the organization 104 to make sensitive data available to remote clients 106 without disclosing the sensitive data to third parties, a data router 110 is provided. The data router 110 is in electronic communication with an organization-controlled server 112 over a first communication channel 114. The organization-controlled server 112 is under the control of the organization 104 and is accessible to remote clients 106. When the data router 110 obtains sensitive data that is to be made available to remote clients 106, the data router 110 secures the sensitive data and transmits the secured sensitive data over the first communication channel 114 to the organization-controlled server 112. The remote clients 106 then obtain the sensitive data from the organization-controlled server 112.

The organization-controlled server 112 may not be able to fulfill certain types of requests from the remote clients 106. For example, the organization-controlled server 112 may not be able to fulfill requests for data relating to the operation of the electronic devices 102. Thus, a third-party server 108 may still be utilized. In FIG. 1, the data router 110 is in electronic communication with a third-party server 108 over a second communication channel 116. When the data router 110 obtains other data, i.e., non-sensitive data, that is to be made available to remote clients 106, the data router 110 transmits the non-sensitive data over the second communication channel 116 to the third-party server 108. Typically, the non-sensitive data relates to the operation of the electronic devices 102, although other types of non-sensitive data may also be transmitted to the third-party server 108. After the non-sensitive data has been transmitted to the third-party server 108, the remote clients 106 may then obtain the non-sensitive data from the third-party server 108. In some embodiments, the data router may secure the non-sensitive data prior to transmitting it to the third-party server 108.

Although the organization may trust the third party with some aspects of device control, this does not mean that the control itself is not sensitive. As a result, means may be used to also secure the communications relating to device control. If the operational/control data is secured, it may be secured such that the third party can access the operational/control data. The sensitive data may still be kept secure from the third party. In other words, even though the third party may be able to access the operational/control data, typically the sensitive data is still secure and can't be accessed by the third party. The term non-sensitive data is used to distinguish this data from the sensitive data. The use of the term non-sensitive data does not necessarily mean that the data is not sensitive, as discussed. The term "other data" may also be used to refer to the "non-sensitive data".

Figure 2:
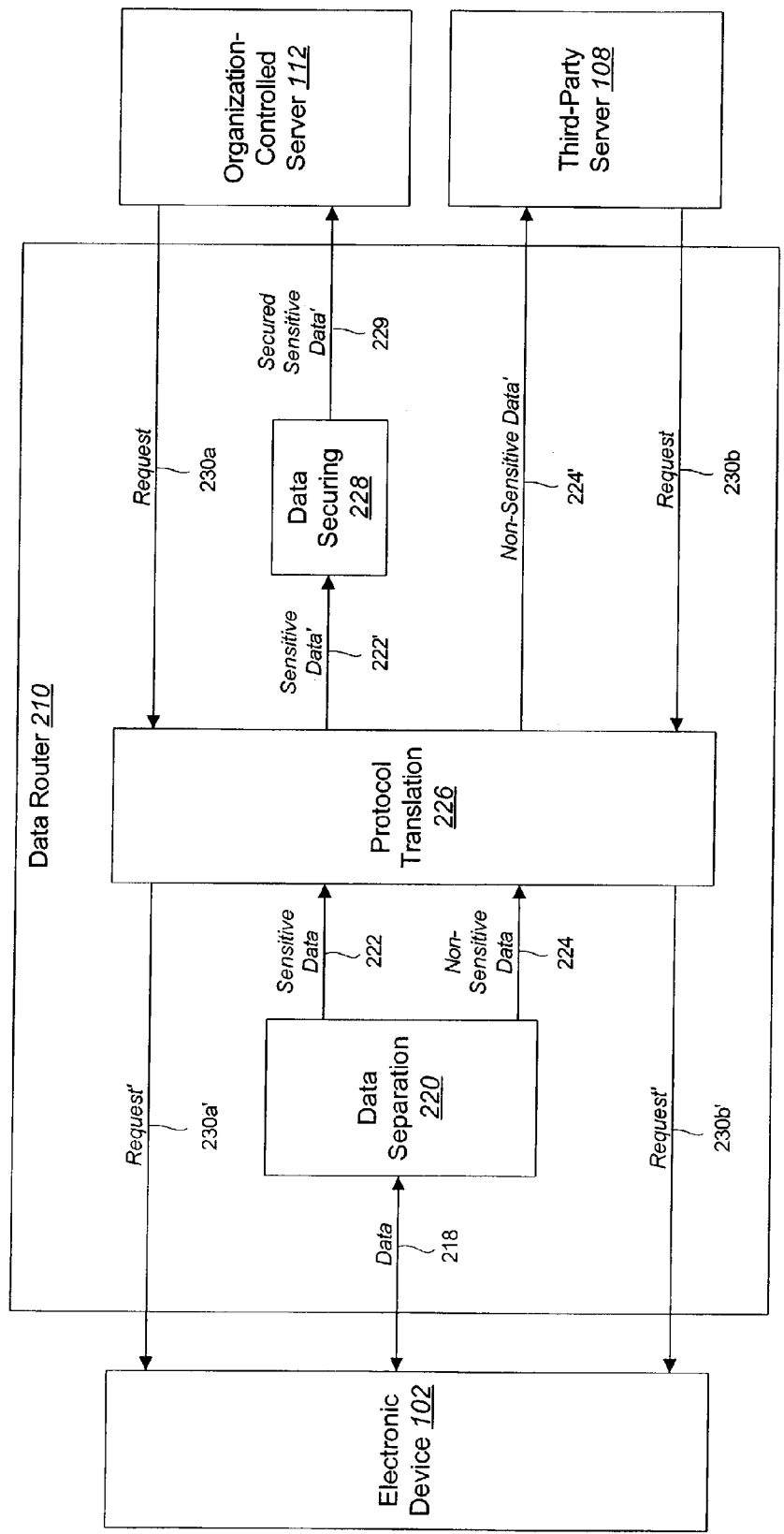
FIG. 2 is a block diagram illustrating logical components in an embodiment of a data router.

FIG. 2 is a block diagram illustrating logical components in an embodiment of a data router 210. Data 218 is shown being transmitted from an electronic device 102 to the data router 210. The data router 210 includes a data separation module 220 that separates the data 218 into sensitive data 222 and non-sensitive (or other) data 224.

In some embodiments, communication between the data router 210 and the electronic devices 102 may operate according to a different communication protocol than communication between the data router 210 and the organization-controlled server 112 and/or the third-party server 108. Thus, the data router 210 may include a protocol translation module 226. The protocol translation module 226 translates the sensitive data 222 into a format that is consistent with the protocol that governs communication between the data router 210 and the organization-controlled server 112 over the first communication channel 114. The protocol translation module 226 translates the non-sensitive data 224 into a format that is consistent with the protocol that governs communication between the data router 210 and the third-party server 108 over the second communication channel 116. In FIG. 2, the sensitive data 222 following protocol translation is denoted as sensitive data' 222', and the non-sensitive data 224 following protocol translation is denoted as non-sensitive data' 224'.

Following protocol translation, the sensitive data' 222' is provided to a data securing module 228. The data securing module 228 secures the sensitive data' 222', thereby providing secured sensitive data' 229. For example, the data securing module 228 may encrypt the sensitive data' 222'. The secured sensitive data' 229 is then transmitted to the organization-controlled server 112 over the first communication channel 114. The non-sensitive data' 224' is transmitted to the third-party server 108 over the second communication channel 116.

In some embodiments, the electronic device 102 transmits data 218 to the data router 110 in response to a request 230 from the organization-controlled server 112 and/or the third-party server 108. The protocol translation module 226 may be used to translate the non-sensitive data 224 into a format that is consistent with the protocol that governs communication between the data router 210 and the electronic devices 102. In FIG. 2, the requests 230 following protocol translation are denoted as requests' 230'.

In the embodiment shown in FIG. 2, the data 218 is shown being transmitted from the electronic device 102 to the data router 210. However, in alternative embodiments, the data router 210 may generate the data 218 on its own. For example, a request' 230' may be transmitted to the electronic device 102. If the electronic device 102 doesn't respond to the request' 230', the data router 210 may generate data 218 which indicates that the electronic device 102 hasn't responded to the request' 230'.

Figure 3:
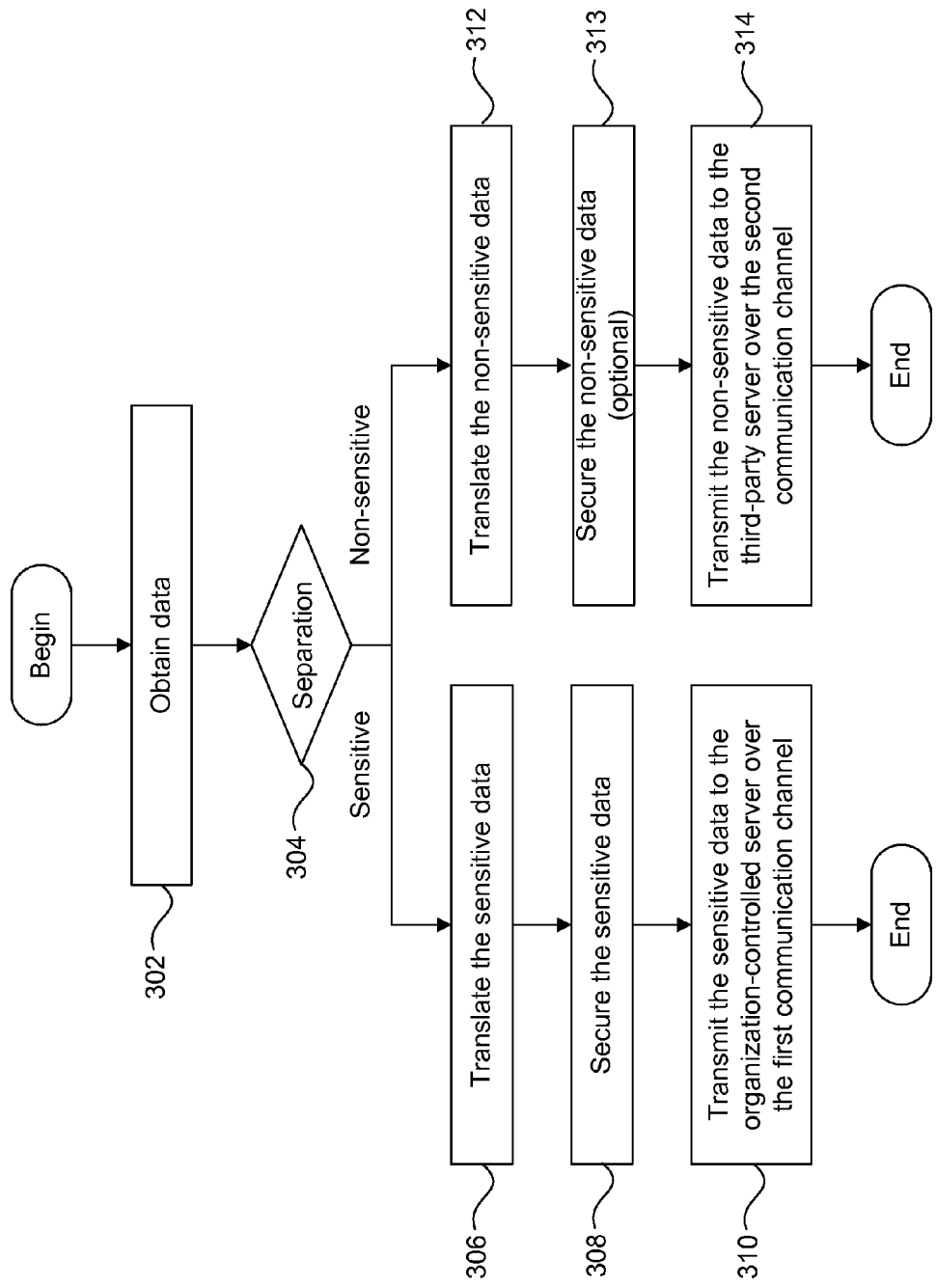
FIG. 3 is a flow diagram illustrating a method for facilitating secure remote access to sensitive data.

FIG. 3 is a flow diagram illustrating a method 300 for facilitating secure remote access to sensitive data. The method 300 illustrated in FIG. 3 may be implemented by the data router 210 shown in FIG. 2 and described in connection therewith.

The method 300 begins when data 218 is obtained 302 by the data router 110. As mentioned previously, the electronic device 102 may simply transmit the data 218 to the data router 210. Alternatively, the electronic device 102 may transmit the data 218 to the data router 210 in response to a request 230 from the organization-controlled server 112 and/or the third-party server 108. Alternatively still, the data router 110 may simply generate the data 218 on its own.

The method 300 then involves separating 304 the data 218 into sensitive data 222 and non-sensitive (or other) data 224. The sensitive data 222 is translated 306 into a format that is consistent with the communication protocol that governs communication between the data router 210 and the organization-controlled server 112. Following protocol translation, the sensitive data' 222' is then secured 308. The secured sensitive data' 222' is then transmitted 310 over the first communication channel 114 to the organization-controlled server 112.

The non-sensitive data 224 is translated 312 into a format that is consistent with the communication protocol that governs communication between the data router 210 and the third-party server 108. The non-sensitive data 224 may also be secured 313. The step of securing the non-sensitive data 224 is an optional step. Following protocol translation, the non-sensitive data' 224' is then transmitted 314 over the second communication channel 116 to the third-party server 108.

Figure 4:
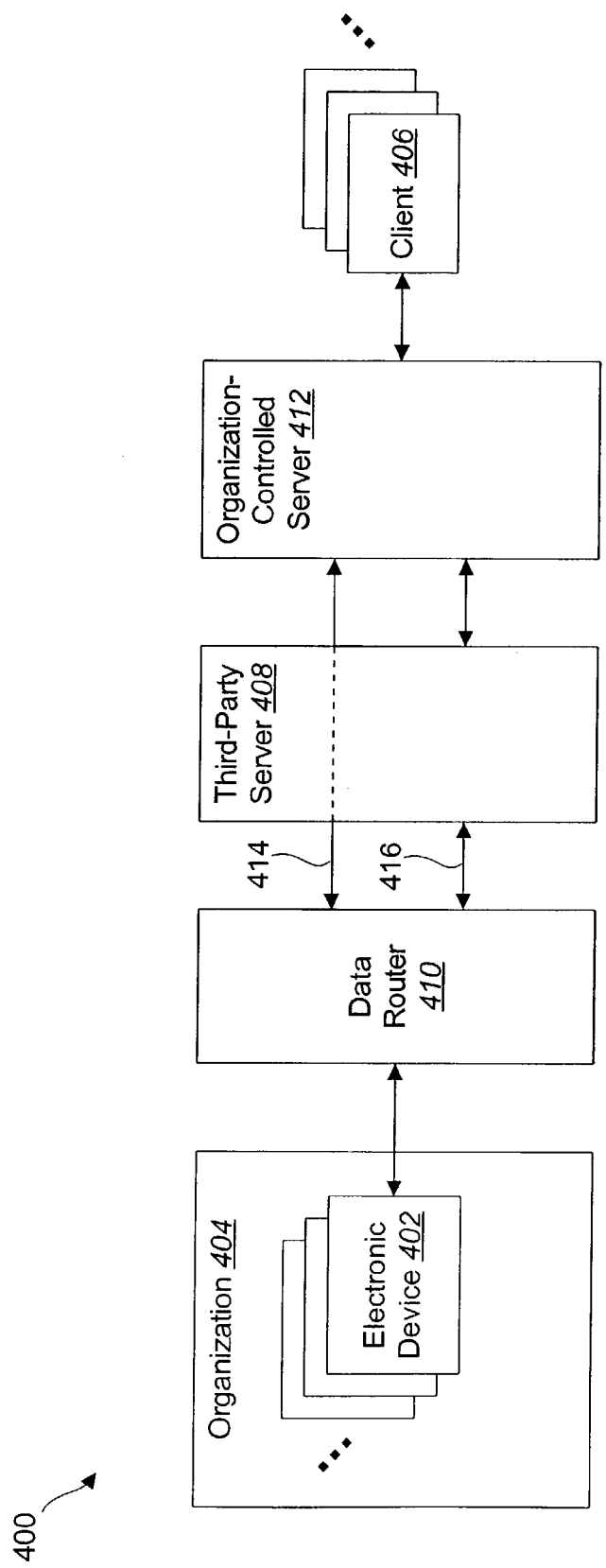
FIG. 4 is a block diagram illustrating an alternative embodiment of a system for facilitating secure remote access to sensitive data.

FIG. 4 is a block diagram illustrating an alternative embodiment of a system 400 for facilitating secure remote access to sensitive data. As before, the system 400 includes a plurality of electronic devices 402 that are under the control of an organization 404. A data router 410 is also provided. The data router 410 is in electronic communication with an organization-controlled server 412 over a first communication channel 414. The data router 410 is also in electronic communication with a third-party server 408 over a second communication channel 416. Both the organization-controlled server 412 and the third-party server 408 fulfill requests for data from authorized remote clients 406.

When the data router 410 obtains sensitive data that is to be made available to remote clients 406, the data router 410 secures the sensitive data and transmits the secured sensitive data over the first communication channel 414 to the organization-controlled server 412. The remote clients 406 then obtain the sensitive data from the organization-controlled server 412. When the data router 410 obtains non-sensitive data that is to be made available to remote clients 406, the data router 410 transmits the non-sensitive data over the second communication channel 416 to the third-party server 408. Typically, the non-sensitive data relates to the operation of the electronic devices 402, although other types of non-sensitive data may also be transmitted to the third-party server 408. After the non-sensitive data has been transmitted to the third-party server 408, the remote clients 406 may then obtain the non-sensitive data from the third-party server 408.

In FIG. 4, the secured sensitive data passes through the third-party server 408 en route to the organization-controlled server 412. That is, secured sensitive data 229 is transmitted to the third-party server 408, but the third-party server 408 is unable to access the secured sensitive data 229. Thus, the third-party server 408 simply allows the secured sensitive data 229 to pass through to the organization-controlled server 412.

Figure 5:
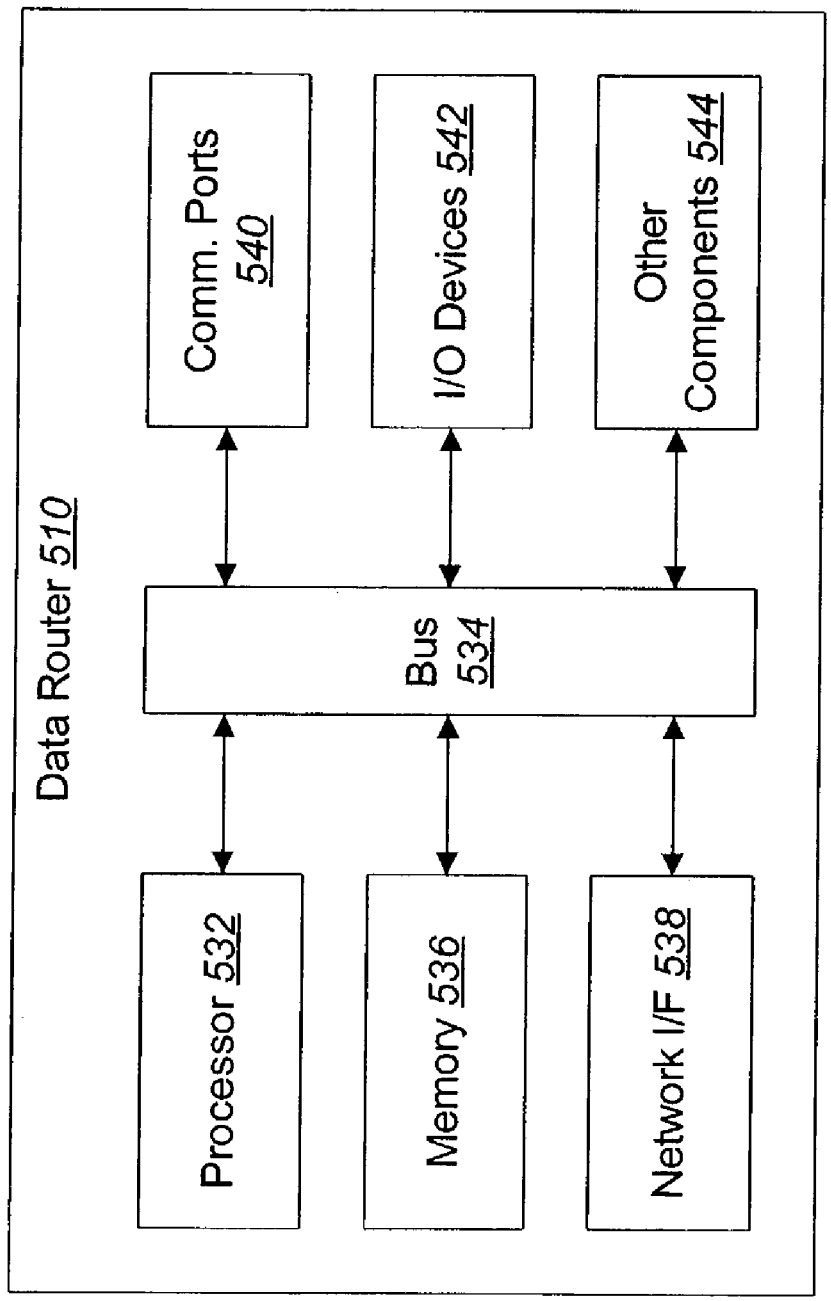
FIG. 5 is a block diagram of hardware components that may be used in an embodiment of a data router.

FIG. 5 is a block diagram of hardware components that may be used in an embodiment of a data router 510. A processor 532 may be provided to control the operation of the data router 510, including the other components thereof, which are coupled to the processor 532 via a bus 534. The processor 532 may be embodied as a microprocessor, microcontroller, digital signal processor or other device known in the art.

The data router 510 also includes memory 536, which may be any type of electronic device capable of storing electronic information. For example, the memory 536 may include a random access memory (RAM) for storing temporary data. Alternatively, or in addition, the memory 536 may include a read-only memory (ROM) for storing more permanent data, such as fixed code and configuration data. The memory 536 may also be embodied as a magnetic storage device, such as a hard disk drive. In certain embodiments, the memory 536 may be on-board memory included with the processor 532. For example, microcontrollers often include a certain amount of on-board memory. The processor 532 performs logical and arithmetic operations based on program instructions stored within the memory 536.

The data router 510 also includes one or more network interfaces 538. Each network interface 538 enables the data router 510 to be connected to a network. Examples of networks include a pager network, a cellular network, a global communications network, the Internet, a computer network, a telephone network, etc. Typically, the data router 510 is in electronic communication with the organization-controlled server 112 and/or the third-party server 108 over one or more networks. The data router 510 may also be in electronic communication with the electronic devices 102 over one or more networks.

The data router 510 also includes one or more communication ports 540. Examples of communication ports 540 include a serial port, a parallel port, an Ethernet port, a token ring port, and the like. The communication ports 540 facilitate electronic communication between the data router 510 and other devices, such as the electronic devices 102, the third-party server 108, and the organization-controlled server 112.

The data router 510 may also include input/output devices 542, such as a keyboard, a mouse, a joystick, a touchscreen, a monitor, speakers, a printer, etc. Other components 544 may also be included in the data router 510.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for facilitating secure remote access to sensitive data from an embedded device, the method being implemented by a data router, the method comprising:
   obtaining the sensitive data together with non-sensitive data, wherein the sensitive data and the non-sensitive data relate to operation of the embedded device, wherein the embedded device and the data router are under the control of an organization;
   separating the sensitive data from the non-sensitive data;
   translating the sensitive data into a format that is consistent with a communication protocol that governs electronic communication over a first communication channel;
   translating the non-sensitive data into a format that is consistent with a communication protocol that governs electronic communication over a second communication channel;
   securing the sensitive data to create secured sensitive data;
   transmitting the secured sensitive data over the first communication channel to an organization-controlled server, wherein the organization-controlled server is also under the control of the organization, wherein the secured sensitive data passes through a third-party server en route to the organization-controlled server, wherein the third-party server is not under the control of the organization;
   transmitting the non-sensitive data over the second communication channel to the third-party server;
   wherein the sensitive data is obtained, secured, and transmitted in response to a request from the organization-controlled server; and
   wherein the non-sensitive data is obtained and transmitted in response to a request from the third-party server;
   wherein obtaining the sensitive data or obtaining the non-sensitive data comprises transmitting a request to the embedded device, determining that the embedded device has not responded to the request, and when the embedded device has not responded, generating data that indicates that the embedded device has not responded to the request;
   wherein the organization-controlled server and the third-party server are accessible to remote clients; and
   wherein the organization-controlled server is unable to fulfill client requests for the non-sensitive data.

* * * * *